US011827772B2

(12) United States Patent
McGrady et al.

(10) Patent No.: US 11,827,772 B2
(45) Date of Patent: Nov. 28, 2023

(54) CELLULOSE ESTER COMPOSITION CONTAINING BLOOM RESISTANT OR BIO-BASED PLASTICIZER

(71) Applicant: Ticona LLC, Florence, KY (US)

(72) Inventors: Christopher McGrady, Walton, KY (US); Rongfu Li, Blacksburg, VA (US); Michael Combs, Shady Spring, WV (US); Xiaowei Zhang, Union, KY (US); Suresh Subramonian, Cary, NC (US)

(73) Assignee: Ticona LLC, Florence, KY (US)

(*) Notice: Subject to any disclaimer, the term of this patent is extended or adjusted under 35 U.S.C. 154(b) by 204 days.

(21) Appl. No.: 17/118,168

(22) Filed: Dec. 10, 2020

(65) Prior Publication Data

US 2021/0171742 A1 Jun. 10, 2021

Related U.S. Application Data

(60) Provisional application No. 63/090,360, filed on Oct. 12, 2020, provisional application No. 62/946,183, filed on Dec. 10, 2019.

(51) Int. Cl.
*C08L 1/12* (2006.01)
*C08K 5/101* (2006.01)
*C08L 67/04* (2006.01)
*C08K 5/09* (2006.01)

(52) U.S. Cl.
CPC .................... *C08L 1/12* (2013.01); *C08K 5/09* (2013.01); *C08K 5/101* (2013.01); *C08L 67/04* (2013.01)

(58) Field of Classification Search
CPC ........ C08L 1/12; C08L 67/04; C08L 2201/06; C08K 5/0016; C08K 5/09; C08K 5/101; C08K 5/103
See application file for complete search history.

(56) References Cited

U.S. PATENT DOCUMENTS

| 5,478,386 | A | 12/1995 | Itoh et al. |
|---|---|---|---|
| 6,235,815 | B1 | 5/2001 | Loercks et al. |
| 6,460,777 | B2 | 10/2002 | Float et al. |
| 6,669,771 | B2 | 12/2003 | Tokiwa et al. |
| 7,678,444 | B2 | 3/2010 | Tedford et al. |
| 7,718,718 | B2 | 5/2010 | Kanzawa et al. |
| 8,334,347 | B2 | 12/2012 | Ding et al. |
| 8,445,604 | B2 | 5/2013 | Li et al. |
| 8,524,832 | B2 | 9/2013 | Cygan |
| 8,563,140 | B2 | 10/2013 | Dellinger et al. |
| 8,586,821 | B2 | 11/2013 | Wang et al. |
| 8,851,084 | B2 | 10/2014 | Lemmouchi et al. |
| 8,906,488 | B2 | 12/2014 | Lee et al. |
| 9,062,186 | B2 | 6/2015 | Longdon et al. |
| 9,328,239 | B2 | 5/2016 | Krishnaswamy |
| 9,441,096 | B2 | 9/2016 | Yao et al. |
| 9,550,884 | B2 | 1/2017 | Yontz et al. |
| 9,605,140 | B2 | 3/2017 | Yao et al. |
| 10,138,357 | B2 | 11/2018 | Yao et al. |
| 10,144,825 | B2 | 12/2018 | Topolkaraev et al. |
| 10,308,790 | B2 | 6/2019 | Yao |
| 10,919,984 | B2 | 2/2021 | Feng et al. |
| 2003/0100645 | A1 | 5/2003 | Ahmed et al. |
| 2006/0142559 | A1* | 6/2006 | Ozaki ........................ C08B 3/06 536/58 |
| 2011/0152818 | A1* | 6/2011 | Wang ........................ C08L 1/26 428/220 |
| 2011/0192605 | A1 | 8/2011 | Wann |
| 2012/0077905 | A1 | 3/2012 | Chen et al. |
| 2012/0202928 | A1 | 8/2012 | Loos et al. |
| 2013/0133549 | A1 | 5/2013 | Conterno |
| 2014/0073745 | A1 | 3/2014 | Bailey et al. |
| 2014/0272131 | A1 | 9/2014 | Combs et al. |
| 2014/0274820 | A1 | 9/2014 | Wann |
| 2015/0174868 | A1 | 6/2015 | Mehlmann et al. |
| 2015/0183196 | A1 | 7/2015 | Zaikov |
| 2015/0210827 | A1 | 7/2015 | Yontz et al. |
| 2015/0307754 | A1 | 10/2015 | Combs et al. |
| 2015/0361310 | A1 | 12/2015 | Combs et al. |
| 2015/0361311 | A1 | 12/2015 | Combs et al. |
| 2016/0068656 | A1 | 3/2016 | Budhavaram et al. |
| 2016/0068665 | A1 | 3/2016 | Budhavaram et al. |
| 2016/0326343 | A1 | 11/2016 | Ambekar et al. |
| 2017/0037218 | A1 | 2/2017 | Kadoma et al. |
| 2018/0127740 | A1 | 5/2018 | Morhet et al. |
| 2018/0362729 | A1 | 12/2018 | Lu et al. |
| 2019/0031860 | A1 | 1/2019 | Moriyama et al. |

(Continued)

FOREIGN PATENT DOCUMENTS

CN 103232618 A 8/2013
CN 103467677 B 12/2013

(Continued)

OTHER PUBLICATIONS

Lovera et al.; Macromolecular Chemistry and Physics, 2007, vol. 208, p. 924-937.*
Klebert et al.; Journal of Applied Polymer Science, 2009, vol. 113, p. 3255-3263.*
International Search Report Corresponding to Application No. PCT/US2020/064233 dated Mar. 2, 2021.
Coltelli, Mallegni, Rizzo, Cinelli and Lazzeri, Blends Containing Cellulose Acetate (CA) Prepared by Reactive Extrusion, *Materials* 2019, vol. 12, 270, www.MDPI.com/journal/materials, pp. 1-20.
Phuong, Verstichel, Cinelli, Anguillesi, Coltelli and Lazzeri, Cellulose Acetate Blends—Effect of Plasticizers on Properties and Biodegradability, *J. Renew. Mater.*, vol. 2, No. 1, Mar. 2014, pp. 35-41.

(Continued)

*Primary Examiner* — Hui H Chin

(74) *Attorney, Agent, or Firm* — Dority & Manning, P.A.

(57) ABSTRACT

A polymer composition containing cellulose acetate in combination with one or more bloom resistant or bio-based plasticizers and optionally one or more bio-based polymers is described. The polymer composition is formulated so as to have properties similar to petroleum-based polymers for producing, for example, single-use biodegradable articles.

20 Claims, 9 Drawing Sheets

(56) References Cited

U.S. PATENT DOCUMENTS

| | | |
|---|---|---|
| 2019/0092927 A1 | 3/2019 | Tanaka et al. |
| 2019/0092929 A1 | 3/2019 | Tanaka et al. |
| 2019/0256613 A1 | 8/2019 | Pecorini et al. |
| 2019/0276562 A1 | 9/2019 | Essaidi |
| 2019/0276637 A1 | 9/2019 | Yao et al. |
| 2019/0276638 A1 | 9/2019 | Yao et al. |
| 2019/0276640 A1 | 9/2019 | Tanaka et al. |
| 2019/0276643 A1 | 9/2019 | Miyazaki et al. |
| 2019/0276644 A1 | 9/2019 | Yao et al. |
| 2019/0359794 A1 | 11/2019 | An et al. |
| 2020/0172710 A1 | 6/2020 | Tanaka et al. |
| 2020/0299447 A1 | 9/2020 | Dang et al. |
| 2021/0040311 A1 | 2/2021 | Tanaka et al. |

FOREIGN PATENT DOCUMENTS

| | | | |
|---|---|---|---|
| CN | 104177795 A | 12/2014 | |
| CN | 104479310 A | 4/2015 | |
| CN | 104744905 A | 7/2015 | |
| CN | 103193964 B | 8/2015 | |
| CN | 104841284 A | 8/2015 | |
| CN | 104988598 A | 10/2015 | |
| CN | 105001604 A | 10/2015 | |
| CN | 105239203 A | 1/2016 | |
| CN | 103897375 B | 3/2016 | |
| CN | 105440610 A | 3/2016 | |
| CN | 103772751 B | 4/2016 | |
| CN | 105462195 A | 4/2016 | |
| CN | 105670288 A | 6/2016 | |
| CN | 103756018 B | 8/2016 | |
| CN | 105038167 B | 8/2016 | |
| CN | 105885367 A | 8/2016 | |
| CN | 106076126 A | 11/2016 | |
| CN | 107163345 A | 9/2017 | |
| CN | 107177178 A | 9/2017 | |
| CN | 107236269 A | 10/2017 | |
| CN | 107663282 A | 2/2018 | |
| CN | 107926368 A | 4/2018 | |
| CN | 108342060 A | 7/2018 | |
| CN | 108440928 A | 8/2018 | |
| CN | 108456407 A | 8/2018 | |
| CN | 108456407 A | 8/2018 | |
| CN | 108498874 A | 9/2018 | |
| CN | 108674817 A | 10/2018 | |
| CN | 108727751 A | 11/2018 | |
| CN | 108948748 A | 12/2018 | |
| CN | 109081954 A | 12/2018 | |
| CN | 109627535 A | 4/2019 | |
| CN | 109897359 A | 6/2019 | |
| EP | 0577562 B1 | 10/2002 | |
| EP | 792913 B1 | 8/2003 | |
| ID | 201700672 S | 12/2017 | |
| IN | 185861 B | 5/2021 | |
| JP | 2000219776 A | 8/2000 | |
| JP | 2000219777 A | 8/2000 | |
| JP | 2001064431 A | 3/2001 | |
| JP | 2001103845 A | 4/2001 | |
| JP | 2001161187 A | 6/2001 | |
| JP | 2001181429 A | 7/2001 | |
| JP | 2001200084 A | 7/2001 | |
| JP | 2001294792 A | 10/2001 | |
| JP | 3680935 B2 | 8/2005 | |
| JP | 2006213916 A | 8/2006 | |
| JP | 3860346 B2 | 12/2006 | |
| JP | 4979111 B2 | 7/2012 | |
| JP | 4996896 B2 | 8/2012 | |
| JP | 5109449 B2 | 12/2012 | |
| JP | 5266659 B2 | 8/2013 | |
| JP | 5375556 B2 | 12/2013 | |
| JP | 2018021148 A | 2/2018 | |
| JP | 2019065099 A | 4/2019 | |
| KR | 20140010742 A | 1/2014 | |
| KR | 101788632 B1 | 10/2017 | |
| KR | 20180121129 A | 11/2018 | |
| WO | WO 2015076250 A1 | 5/2015 | |
| WO | WO 2016188961 A1 | 12/2016 | |
| WO | WO 2019160908 A1 | 8/2019 | |
| WO | WO 2019171611 A1 | 9/2019 | |

OTHER PUBLICATIONS

Arkema, Biostrength® 150: Opaque Impact Modifier.
Krishnaswamy et al., Impact Modification of PLA Using Biobased, Biodegradable Mirel™ PHB Copolymers, 2014, pp. 1-4.
Polybutylene Adipate Terephthalate, *Wikipedia, The Free Encyclopedia*, 2022, https://en.wikipedia.org/w/index.php?title=Polybutylene_adipate_terephthalate&oldid=111858264.
Chinese First Office Action Report Corresponding to Application No. 202080096141.1 dated Jun. 3, 2023.

* cited by examiner

CELLULOSE ESTER COMPOSITION CONTAINING BLOOM RESISTANT OR BIO-BASED PLASTICIZER

RELATED APPLICATIONS

The present application is based upon and claims priority to U.S. Provisional Patent Application Ser. No. 62/946,183, having a filing date of Dec. 10, 2019 and U.S. Provisional Patent Application Ser. No. 63/090,360, having a filing date of Oct. 12, 2020, both of which are incorporated herein by reference.

BACKGROUND

Each year, the global production of plastics continues to increase. Over one-half of the amount of plastics produced each year are used to produce plastic bottles, containers, drinking straws, and other single-use items. For example, over 100 million disposable plastic straws are manufactured and placed in use every year.

The discarded, single-use plastic articles, including plastic drinking bottles and straws, are typically not recycled and end up in landfills. In addition, many of these items are not properly disposed of and end up in streams, lakes, and in the oceans around the world. In fact, plastic waste tends to agglomerate and concentrate in oceans in certain areas of the world due to currents and the buoyancy of the products.

Plastic waste can be harmful to ecosystems and to animals, including marine life and birds. Plastic waste, for instance, disintegrates very slowly into smaller and smaller pieces that become ingested by aquatic organisms and fish.

In view of the above, those skilled in the art have attempted to produce plastic articles made from biodegradable polymers. Many biodegradable polymers, however, lack the physical properties and characteristics of conventional polymers, such as polypropylene and/or polyethylene terephthalate.

Cellulose esters have been proposed in the past as a replacement to some petroleum-based polymers or plastics. Cellulose esters, for instance, are generally considered environmentally-friendly polymers because they are recyclable, degradable and derived from renewable resources, such as wood pulp. Problems have been experienced, however, in melt processing cellulose ester polymers, such as cellulose acetate polymers. The polymer materials are relatively stiff and have relatively poor elongation properties. In addition, the melting temperature of cellulose ester polymers is very close to the degradation temperature, further creating obstacles to melt processing the polymers successfully.

In order to improve the ability to melt process cellulose esters, the cellulose esters have conventionally been combined with various different plasticizers. In fact, in some applications, relatively great amounts of plasticizers are added with cellulose esters in order for the resulting composition to be used in extrusion and injection molding processes. Many plasticizers, however, have a tendency to migrate to the surface of the formed polymer article. Thus, the plasticizer can transfer to an adjacent surface or to any substance that comes into contact with the molded article.

In view of the above, a need currently exists for biodegradable polymer compositions that are well suited for use in food handling applications. More particularly, a need currently exists for a cellulose ester composition containing a plasticizer, wherein the plasticizer is resistant to blooming or migration to the surface of any article formed from the composition. A need also exists for a cellulose acetate polymer composition containing a plasticizer that is also bio-based and therefore biodegradable.

SUMMARY

In general, the present disclosure is directed to a polymer composition containing a cellulose acetate polymer in combination with a bloom resistant or bio-based plasticizer. Optionally, the polymer composition can also contain at least one other bio-based polymer in addition to the cellulose acetate. The bloom resistant or bio-based plasticizer improves the ability of the composition to be melt processed while also maintaining the food grade characteristics of the cellulose acetate. The at least one other bio-based polymer combined with the cellulose acetate and the plasticizer can further enhance one or more physical properties of the cellulose acetate and/or facilitate melt processing. The polymer composition is well suited for producing polymer articles, such as beverage holders, other plastic containers, drinking straws, hot beverage pods, automotive parts, consumer appliance parts, and the like.

In one aspect, the present disclosure is directed to a polymer composition comprising a cellulose acetate, a bloom resistant or bio-based plasticizer, and optionally at least one bio-based polymer in addition to the cellulose acetate and plasticizer. The bloom resistant or bio-based plasticizer can be phthalate-free. The plasticizer, for instance, may comprise a benzoate ester, an alkyl ketal ester, a non-petroleum hydrocarbon ester, a low molecular weight bio-based polymer, such as polycaprolactone, having a number average molecular weight of 2000 or less, such as 1000 or less, or mixtures thereof. For example, the plasticizer may comprise a glycerol tribenzoate or a sucrose benzoate. In one aspect, the plasticizer may comprise a blend of a benzoate ester and an alkyl ketal ester. In still another aspect, the plasticizer can comprise a non-petroleum hydrocarbon ester having a specific gravity of from about 1.17 to about 1.18 when measured at 25° C. The plasticizer can be present in the polymer composition in an amount from about 8% to about 40% by weight, such as in an amount from about 12% to about 20% by weight. In one aspect, the one or more plasticizers are present in an amount of about 19% by weight or less, such as about 17% by weight or less, such as about 15% by weight or less, such as about 12% by weight or less.

As described above, the polymer composition can optionally contain at least one bio-based polymer in addition to the cellulose acetate and plasticizer. The at least one bio-based polymer, for instance, can comprise a polylactic acid, a polycaprolactone, a polyhydroxyalkanoate, or mixtures thereof. In one aspect, the different components are blended together in a manner that produces a polymer composition which exhibits a flexural modulus of about 2,000 MPa or less. For instance, the polymer composition can have a flexural modulus of about 1800 MPa or less, such as about 1600 MPa or less, and generally greater than about 500 MPa. In addition, the polymer composition can exhibit an elongation at break of about 10% or greater, such as about 12% or greater, such as about 15% or greater, such as about 20% or greater, and generally about 150% or less.

The cellulose acetate can be present in the composition in an amount from about 15% to about 85% by weight, such as from about 55% to about 80% by weight. The cellulose acetate can be comprised primarily of cellulose diacetate. For instance, the cellulose acetate can contain cellulose diacetate in an amount greater than about 90% by weight, such as in an amount greater than about 95% by weight.

The one or more bio-based polymers can be present in the polymer composition in an amount of from about 1% to about 50% by weight, such as in an amount of about 3% or greater, such as in an amount of about 5% or greater, such as in an amount of about 7% or greater, such as in an amount of about 10% or greater, and generally in an amount of about 30% or less, such as in an amount of about 25% or less, such as in an amount of about 20% or less.

In one embodiment, the bio-based polymer incorporated into the polymer composition is a polyhydroxyalkanoate, particularly polyhydroxybutyrate. Alternatively, the bio-based polymer may comprise poly(3-hydroxybutyrate-co-3-hydroxy valerate)). In one aspect, the polymer composition contains at least two bio-based polymers in addition to the cellulose acetate and plasticizer. For instance, the polymer composition can contain a polylactic acid in combination with a polyhydroxyalkanoate.

The present disclosure is also directed to an article made from the polymer composition as described above. Polymer articles that may be made in accordance with the present disclosure include drinking straws, beverage holders, automotive parts, knobs, door handles, lids, packaging, cutlery, consumer appliance parts, containers and any other suitable disposable product. For instance, the present disclosure is directed to a drinking straw comprising an elongated tubular member defining a passageway from a first end to a second and opposite end. The drinking straw is formed from a polymer composition as described above.

The cellulose ester polymer composition can also be used to produce molded articles for use in the medical field. For example, the composition can be used to produce housing for medical devices that provides a warm touch. The housing can be made from a composition containing a cellulose ester polymer, a plasticizer and optionally a bio-based polymer.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
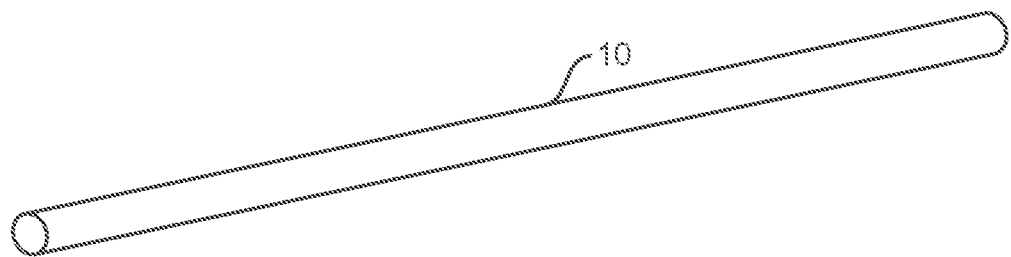
FIG. 1 is a perspective view of a drinking straw that may be made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only and is not intended as limiting the broader aspects of the present disclosure.

In general, the present disclosure is directed to polymer compositions containing a cellulose acetate in combination with other polymers and components that improve the melt processing properties of the cellulose acetate and/or the physical properties of the cellulose acetate. In accordance with the present disclosure, a cellulose acetate is combined with a bloom resistant or bio-based plasticizer and optionally one or more other bio-based polymers. Polymer compositions formulated in accordance with the present disclosure, for instance, can have dramatically improved stiffness and elongation properties in comparison to conventional cellulose acetate polymer formulations. In addition, the polymer composition of the present disclosure can be formulated to be biodegradable and thus environmentally friendly. The polymer composition can be used to form all different types of products using any suitable molding technique, such as extrusion, injection molding, rotational molding, gel processing, and the like.

As used herein, a "bio-based" polymer or plasticizer refers to a polymer, oligomer, or compound produced from at least partially renewable biomass sources, such as produced from plant matter or food waste. For example, a bio-based polymer can be a polymer produced from greater than 30% renewable resources, such as greater than about 40% renewable resources, such as greater than about 50% renewable resources, such as greater than about 60% renewable resources, such as greater than about 70% renewable resources, such as greater than about 80% renewable resources, such as greater than about 90% renewable resources. Bio-based polymers are to be distinguished from polymers derived from fossil resources such as petroleum. Bio-based polymers can be bio-derived meaning that the polymer originates from a biological source or produced via a biological reaction, such as through fermentation or other microorganism process. Although a cellulose ester polymer can be considered a bio-based polymer, the term herein refers to other bio-based substances that can be combined with cellulose ester polymers.

The present disclosure is particularly directed to combining a cellulose acetate with a bloom resistant or bio-based plasticizer. A plasticizer is selected, for instance, so that the food grade characteristics of the cellulose acetate are not compromised. In addition, a plasticizer can also be selected so that the plasticizer resists migration to the surface on an article formed from the composition and does not transfer to other surfaces or substances that come into contact with the polymer article. A plasticizer is selected that also greatly enhances or improves the melt processing characteristics of the cellulose acetate.

In general, any suitable cellulose ester polymer can be incorporated into the polymer composition of the present disclosure. In one aspect, the cellulose ester polymer is a cellulose acetate.

Cellulose acetate may be formed by esterifying cellulose after activating the cellulose with acetic acid. The cellulose may be obtained from numerous types of cellulosic material, including but not limited to plant derived biomass, corn stover, sugar cane stalk, bagasse and cane residues, rice and wheat straw, agricultural grasses, hardwood, hardwood pulp, softwood, softwood pulp, cotton linters, switchgrass, bagasse, herbs, recycled paper, waste paper, wood chips, pulp and paper wastes, waste wood, thinned wood, willow, poplar, perennial grasses (e.g., grasses oftheMiscanthus family), bacterial cellulose, seed hulls (e.g., soy beans), cornstalk, chaff, and other forms of wood, bamboo, soyhull, bast fibers, such as kenaf, hemp, jute and flax, agricultural residual products, agricultural wastes, excretions of livestock, microbial, algal cellulose, seaweed and all other materials proximately or ultimately derived from plants. Such cellulosic raw materials are preferably processed in pellet, chip, clip, sheet, attritioned fiber, powder form, or other form rendering them suitable for further purification.

Cellulose esters suitable for use in producing the composition of the present disclosure may, in some embodiments, have ester substituents that include, but are not limited to, $C_1$-$C_{20}$ aliphatic esters (e.g., acetate, propionate, or butyrate), functional $C_1$-$C_{20}$ aliphatic esters (e.g., succinate, glutarate, maleate) aromatic esters (e.g., benzoate or phthalate), substituted aromatic esters, and the like, any derivative thereof, and any combination thereof.

The cellulose acetate used in the composition may be cellulose diacetate or cellulose triacetate. In one embodiment, the cellulose acetate comprises primarily cellulose diacetate. For example, the cellulose acetate can contain less than 1% by weight cellulose triacetate, such as less than about 0.5% by weight cellulose triacetate. Cellulose diacetate can make up greater than 90% by weight of the cellulose acetate, such as greater than about 95% by weight, such as greater than about 98% by weight, such as greater than about 99% by weight of the cellulose acetate.

In general, the cellulose acetate can have a molecular weight of greater than about 10,000, such as greater than about 20,000, such as greater than about 30,000, such as greater than about 40,000, such as greater than about 50,000. The molecular weight of the cellulose acetate is generally less than about 300,000, such as less than about 250,000, such as less than about 200,000, such as less than about 150,000, such as less than about 100,000, such as less than about 90,000, such as less than about 70,000, such as less than about 50,000. The molecular weights identified above refer to the number average molecular weight. Molecular weight can be determined using gel permeation chromatography using a polystyrene equivalent or standard.

The cellulose ester polymer or cellulose acetate can have an intrinsic viscosity of generally greater than about 0.5 dL/g, such as greater than about 0.8 dL/g, such as greater than about 1 dL/g, such as greater than about 1.2 dL/g, such as greater than about 1.4 dL/g, such as greater than about 1.6 dL/g. The intrinsic viscosity is generally less than about 2 dL/g, such as less than about 1.8 dL/g, such as less than about 1.7 dL/g, such as less than about 1.65 dL/g. Intrinsic viscosity may be measured by forming a solution of 0.20 g/dL cellulose ester in 98/2 wt/wt acetone/water and measuring the flow times of the solution and the solvent at 30° C. in a #25 Cannon-Ubbelohde viscometer. Then, the modified Baker-Philippoff equation may be used to determine intrinsic viscosity ("IV"), which for this solvent system is Equation 1.

$$IV=(k/c)(\text{anti log}(\log n_{rel})/k)-1) \qquad \text{Equation 1}$$

where $\pi_{rel}=(t_1/t_2)$,
$t_1$=the average flow time of solution (having cellulose ester) in seconds, $t_2$=the average flow times of solvent in seconds, k=solvent constant (10 for 98/2 wt/wt acetone/water), and c=concentration (0.200 g/dL).

In one embodiment, the cellulose acetate can be modified to have a lower glass transition temperature, allowing the modified cellulose acetate to be melt processed using less or no plasticizer. For example, the cellulose acetate can be modified with an acyl moiety. The modified cellulose acetate may have an acetyl degree of substitution of from about 0.05 to about 2.55 and a degree of substitution for the acyl moiety from about 0.05 to about 0.75. The modified cellulose acetate may have a glass transition temperature of from about 50° C. to about 195° C., such as from about 50° C. to about 130° C. Glass transition temperature may be determined according to ASTM Test D7426-08 (2013). In one embodiment, the modification is done using an alkenyl succinic anhydride.

The cellulose acetate is generally present in the polymer composition in an amount greater than about 15% by weight, such as in an amount greater than about 25% by weight, such as in an amount greater than about 35% by weight, such as in an amount greater than about 45% by weight, such as in an amount greater than about 55% by weight. The cellulose acetate is generally present in the polymer composition in an amount less than about 85% by weight, such as in an amount less than about 80% by weight, such as in an amount less than about 75% by weight, such as in an amount less than about 70% by weight, such as in an amount less than about 65% by weight.

A cellulose acetate as described above is combined with a plasticizer in accordance with the present disclosure. A plasticizer is selected that is bloom resistant and/or bio-based. The migration characteristics of plasticizers are very unpredictable based upon the different components contained in the polymer composition. Thus, selecting a plasticizer that is bloom resistant for use in the polymer composition of the present disclosure can be problematic based on the voluminous number of plasticizers that have been used in the past. It was unexpectedly discovered, however, that certain plasticizers were found to be bloom resistant, especially in a polymer composition containing cellulose acetate alone or in combination with other bio-based polymers.

For example, in one aspect, the bloom resistant plasticizer is a benzoate ester. Particular benzoate esters that have been found to be bloom resistant in cellulose acetate compositions include glycerol tribenzoate, sucrose benzoate, and mixtures thereof. The benzoate ester can be used alone or in combination with a compatibilizer. The compatibilizer may comprise a glycol, such as a polyalkylene glycol. For example, the compatibilizer may comprise polyethylene glycol. The compatibilizer may further inhibit migration or blooming.

In addition to or as an alternative to incorporating a bloom resistant plasticizer into the polymer composition of the present disclosure, the plasticizer can also be bio-based. For example, using a bio-based plasticizer can render the polymer composition well suited for contact with food items even if some migration occurs. Bio-based plasticizers particularly well suited for use in the composition of the present disclosure include an alkyl ketal ester, a non-petroleum hydrocarbon ester, a bio-based polymer or oligomer, such as polycaprolactone, having a number average molecular weight of 2000 or less, or mixtures thereof. In one embodiment, the polymer composition can contain a blend of plasticizers including a bloom resistant plasticizer combined with a bio-based plasticizer.

In one aspect, the bio-based plasticizer is an alkyl ketal ester having a chemical structure corresponding to Structure I as provided below:

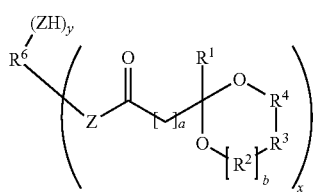

wherein a is from 0 to 12; b is 0 or 1; each $R^1$ is independently hydrogen, a hydrocarbyl group, or a substituted hydrocarbyl group; each $R^2$, $R^3$, and $R^4$ are independently methylene, alkylmethylene, or dialkylmethylene, x is at least 1, y is 0 or a positive number and x+y is at least 2; $R^6$ is a hydrocarbyl group or a substituted hydrocarbyl group and each Z is independently —O—, —NH— or —NR— where R is a hydrocarbyl group or a substituted hydrocarbyl group.

The plasticizer identified above corresponds to a reaction product of a polyol, aminoalcohol or polyamine and certain 1,2- and/or 1,3-alkanediol ketal of an oxocarboxylate esters. 1,2- and 1,3-alkanediols ketals of oxocarboxylate esters are referred to herein as "alkyl ketal esters". Up to one mole of alkyl ketal ester can be reacted per equivalent of hydroxyl groups or amino groups provided by the polyol, aminoalcohol or polyamine. The polyol, aminoalcohol or polyamine is most preferably difunctional, but polyols, aminoalcohols and polyamines having more than two hydroxyl and/or amino groups can be used.

The values of x and y in structure I will depend on the number of hydroxyl groups or amino groups on the polyol, aminoalcohol or polyamine, the number of moles of the alkyl ketal ester per mole of the polyol, aminoalcohol or polyamine, and the extent to which the reaction is taken towards completion. Higher amounts of the alkyl ketal ester favor lower values for y and higher values of x.

In structure I, y is specifically from 0 to 2 and x is specifically at least 2. All a in structure I are specifically 2 to 12, more specifically, 2 to 10, more specifically, 2 to 8, more specifically, 2 to 6, more specifically, 2 to 4, and more specifically, 2. All $R^1$ are specifically an alkyl group, specifically methyl. In some embodiments of structure, all Z are —O—, y is 0 and x is 2; these products correspond to a reaction of two moles of an alkyl ketal ester and one mole of a diol. In some other embodiments, all Z are —O—, y is 1 and x is 1; these products correspond to the reaction of one mole of the alkyl ketal ester and one mole of a diol.

In one embodiment, all b are 0. In another embodiment, all b are 1.

Some specific compounds according to structure I include those having the structure:

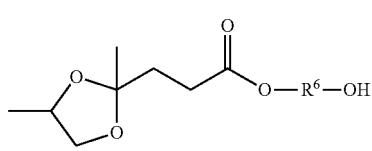

or the structure

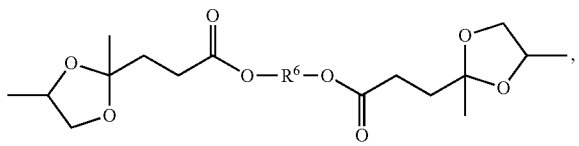

or the structure

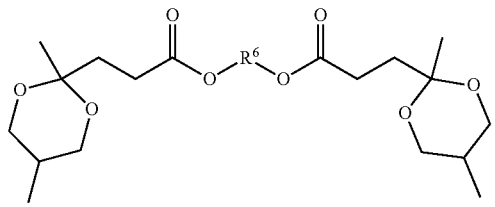

particularly in which $R^6$ is —(CH$_2$)—$_m$ wherein m is from 2 to 18, especially 2, 3, 4 or 6. In one specific embodiment, $R^6$ corresponds to the residue, after removal of hydroxyl groups, of 1,4-butane diol resulting in the structure (Ia)

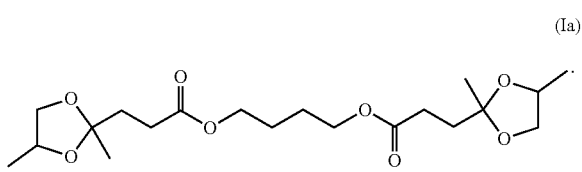

In another specific embodiment, $R^6$ corresponds to the residue, after removal of hydroxyl groups, of diethylene glycol resulting in structure (Ib)

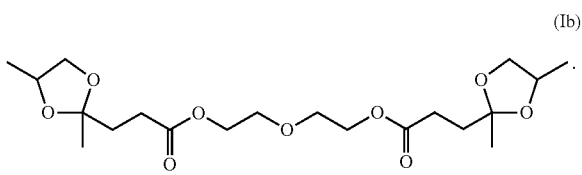

In another specific embodiment, $R^6$ corresponds to the residue, after removal of hydroxyl groups, of 2-methyl. 1-3 propane diol resulting in structure (Ic)

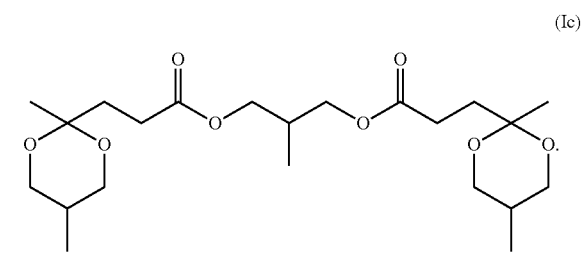 [SMILES: CC(COC(=O)CCC1(C)OCC(C)CO1)COC(=O)CCC1(C)OCC(C)CO1]

Compounds according to structure I can be prepared in a transesterification or ester-aminolysis reaction between the corresponding polyol, aminoalcohol or polyamine and the corresponding alkyl ketal ester. Alternatively, compounds according to structure I can be prepared by reacting an oxocarboxylic acid with the polyol, aminoalcohol or polyamine to form an ester or amide, and then ketalizing the resulting product with a 1,2- or 1,3-alkane diol such as ethylene glycol, 1,2-propanediol, 1,3-propanediol, 2-methyl, 1-3 propane diol, 1,2-butanediol, 1,3-butanediol, 1,2-pentanediol, 1,3-pentanediol, 1,2-hexanediol, 1,3-hexanediol, and the like.

Alkyl ketal ester plasticizers are particularly well suited for use in conjunction with one or more other plasticizers. For example, in one aspect, an alkyl ketal ester plasticizer can be combined with a bloom resistant plasticizer, such as a benzoate ester. The weight ratio between the two plasticizers can vary such as from about 1:10 to about 10:1, such as from about 1:4 to about 4:1.

Another bio-based plasticizer that may be incorporated into the polymer composition of the present disclosure is a non-petroleum hydrocarbon ester. For example, one example of a non-petroleum hydrocarbon ester is sold under the tradename HALLGREEN by the Hall Star Company of Chicago, Ill. Non-petroleum hydrocarbon ester plasticizers, for instance, can contain greater than about 50% by weight, such as greater than about 70% by weight, such as greater than about 99% by weight of bio-based content. The esters, for instance, can be derived primarily from agricultural, forestry, or marine materials and thus are biodegradable. In one aspect, the non-petroleum hydrocarbon ester plasticizer has a specific gravity at 25° C. of about 1.16 or greater, such as about 1.165 or greater, such as about 1.17 or greater, such as about 1.74 or greater, and generally about 1.19 or less, such as about 1.185 or less, such as about 1.18 or less, such as about 1.78 or less. The non-petroleum hydrocarbon ester plasticizer can have an acid value of from about 0.5 mgKOH/g to about 0.6 mgKOH/g, such as from about 0.53 mgKOH/g to about 0.57 mgKOH/g.

In another aspect, the polymer composition contains a bio-based plasticizer that is a bio-based polyester, such as a bio-based aliphatic polyester having a relatively low molecular weight. For example, the plasticizer can comprise a bio-based polyester polymer having a number average molecular weight of less than about 2000, such as less than about 1000, such as less than about 900, such as less than about 800, and generally greater than about 500. In one embodiment, the bio-based plasticizer is a polycaprolactone having a number average molecular weight of 1000 or less. Alternatively, the bio-based plasticizer may be a polyhydroxyalkanoate having a number average molecular weight of 1000 or less.

In one embodiment, the plasticizer can be grafted to the cellulose acetate. For example, a bio-based plasticizer can be grafted to the cellulose acetate using a catalyst, such as a tin octanoate catalyst. For example, in one embodiment, a polycaprolactone plasticizer can be grafted to the cellulose acetate.

In one aspect, the plasticizer is phthalate-free. In fact, the polymer composition can be formulated to be phthalate-free. For instance, phthalates can be present in the polymer composition in an amount of about 0.5% or less, such as in an amount of about 0.1% or less.

In general, one or more plasticizers can be present in the polymer composition in an amount from about 8% to about 40% by weight, such as in an amount from about 12% to about 35% by weight. In the past, however, it was believed that relatively high amounts of plasticizer were needed in order to produce a cellulose acetate composition capable of being melt processed. However, the amount of plasticizer can be significantly and dramatically reduced without compromising the melt processing characteristics of the composition. For example, in one aspect, one or more plasticizers can be present in the polymer composition in an amount of about 19% or less, such as in an amount of about 17% or less, such as in an amount of about 15% or less, such as in an amount of about 13% or less, such as in an amount of about 10% or less. One or more plasticizers are generally present in an amount from about 5% or greater, such as in an amount of about 10% or greater.

The cellulose acetate can be present in relation to the plasticizer such that the weight ratio between the cellulose acetate and the one or more plasticizers is from about 60:40 to about 85:15, such as from about 70:30 to about 80:20. In one embodiment, the cellulose acetate to plasticizer weight ratio is about 75:25.

The cellulose acetate and the one or more plasticizers can also be combined with one or more bio-based polymers that are different than the cellulose acetate and the one or more plasticizers. In one aspect, the bio-based polymer can be a polyester polymer, such as an aliphatic polyester. Particular bio-based polymers that may be incorporated into the polymer composition include polyhydroxyalkanoates, polylactic acid, polycaprolactone, or mixtures thereof.

In one aspect, the physical properties of the cellulose acetate can be particularly improved if at least one bio-based polymer is combined with the cellulose acetate that has a low glass transition temperature and/or is amorphous or is semi-crystalline. For example, a bio-based polymer can be selected for combining with the cellulose acetate that is completely or substantially amorphous or has a low degree of crystallinity. The degree of crystallinity is the fraction of the polymer that exists in an orderly state, having a lattice structure. For example, the bio-based polymer combined with the cellulose acetate can have a crystallinity of less than about 30%, such as less than about 25%, such as less than about 20%, such as less than about 15%, such as less than about 10%, such as less than about 5%. The degree of crystallinity can be determined using X-ray and electron diffraction, differential scanning calorimetry, infrared absorption (FTIR) or Raman spectroscopy.

The at least one bio-based polymer combined with the cellulose acetate can also have a relatively low glass transition temperature. For instance, the glass transition temperature of the bio-based polymer can be less than about 40° C., such as less than about 20° C., such as less than about 10° C., such as less than about 5° C., such as less than about 0° C., such as less than about −5° C., such as less than about −10° C., such as less than about −20° C. The glass transition temperature (Tg) is generally greater than about −40° C., such as greater than about −30° C.

In comparison, the glass transition temperature of cellulose acetate is generally from 160° C. to 180° C. Differences in glass transition temperatures can lead to compatibility issues. However, to the contrary, the use of a bio-based polymer with a low glass transition temperature and/or low crystallinity has been found to not only be compatible with cellulose acetate, but also improves many physical properties of the cellulose acetate including elongation to break and toughness. The addition of the bio-based polymer as described above can also reduce the flexural modulus.

In one aspect, the at least one bio-based polymer combined with the cellulose acetate is a polyhydroxyalkanoate. The polyhydroxyalkanoate can be a homopolymer or a copolymer. Polyhydroxyalkanoates, also known as "PHAs", are linear polyesters produced in nature by bacterial fermentation of sugar or lipids. More than 100 different monomers can be combined within this family to give materials with extremely different properties. Generally, they can be either thermoplastic or elastomeric materials, with melting-points ranging from 40 to 180° C. The most common type of PHAs is PHB (poly-beta-hydroxybutyrate). Poly(3-hydroxybutyrate) (PHB) is a type of a naturally occurring thermoplastic polymer currently produced microbially inside of the cell wall of a number of wild bacteria species or genetically modified bacteria or yeasts, etc. It is biodegradable and does not present environmental issues post disposal, i.e., articles made from PHB can be composted.

The one or monomers used to produce a PHA can significantly impact the physical properties of the polymer. For example, PHAs can be produced that are crystalline, semi-crystalline, or completely amorphous. For example, poly-4-hydroxybutyrate homopolymer can be completely amorphous with a glass transition temperature of less than about −30° C. and with no noticeable melting point temperature. Polyhydroxybutyrate-valerate copolymers also can be formulated to be semi-crystalline to amorphous having low stiffness characteristics.

Examples of monomer units that can be incorporated in PHAs include 2-hydroxybutyrate, glycolic acid, 3-hydroxybutyrate (hereinafter referred to as 3HB), 3-hydroxypropionate (hereinafter referred to as 3HP), 3-hydroxyvalerate (hereinafter referred to as 3HV), 3-hydroxyhexanoate (hereinafter referred to as 3HH), 3-hydroxyheptanoate (hereinafter referred to as 3HH), 3-hydroxyoctanoate (hereinafter referred to as 3HO), 3-hydroxynonanoate (hereinafter referred to as 3HN), 3-hydroxydecanoate (hereinafter referred to as 3HD), 3-hydroxydodecanoate (hereinafter referred to as 3HDd), 4-hydroxybutyrate (hereinafter referred to as 4HB), 4-hydroxyvalerate (hereinafter referred to as 4HV), 5-hydroxyvalerate (hereinafter referred to as 5HV), and 6-hydroxyhexanoate (hereinafter referred to as 6HH). 3-hydroxyacid monomers incorporated into PHAs are the (D) or (R) 3-hydroxyacid isomer with the exception of 3HP which does not have a chiral center.

In some embodiments, the PHA in the methods described herein is a homopolymer (where all monomer units are the same). Examples of PHA homopolymers include poly 3-hydroxyalkanoates (e.g., poly 3-hydroxypropionate (hereinafter referred to as P3HP)), poly 3-hydroxybutyrate (hereinafter referred to as P3HB) and poly 3-hydroxyvalerate, poly 4-hydroxyalkanoates (e.g., poly 4-hydroxybutyrate (hereinafter referred to as P4HB)), poly 4-hydroxyvalerate (hereinafter referred to as P4HV)) or poly 5-hydroxyalkanoates (e.g., poly 5-hydroxyvalerate (hereinafter referred to as P5HV)).

In certain embodiments, the PHA can be a copolymer (containing two or more different monomer units) in which the different monomers are randomly distributed in the polymer chain. Examples of PHA copolymers include poly 3-hydroxybutyrate-co-3-hydroxypropionate (hereinafter referred to as PHB3HP), poly 3-hydroxybutyrate-co-4-hydroxybutyrate (hereinafter referred to as P3HB4HB), poly 3-hydroxybutyrate-co-4-hydroxyvalerate (hereinafter referred to as PHB4HV), poly 3-hydroxybutyrate-co-3-hydroxyvalerate (hereinafter referred to as PHB3HV), poly 3-hydroxybutyrate-co-3-hydroxyhexanoate (hereinafter referred to as PHB3HH) and poly 3-hydroxybutyrate-co-5-hydroxyvalerate (hereinafter referred to as PHB5HV).

An example of a PHA having 4 different monomer units would be PHB-co-3HH-co-3HO-co-3HD or PHB-co-3-HO-co-3HD-co-3HDd. Typically where the PHB3HX has 3 or more monomer units, the 3HB monomer is at least 70% by weight of the total monomers, such as greater than 90% by weight of the total monomers.

In one embodiment of the present disclosure, a cellulose acetate is combined with a PHA that has a crystallinity of about 25% or less and has a low glass transition temperature. For instance, the glass transition temperature can be less than about 10° C., such as less than about 5° C., such as less than about 0° C., such as less than about −5° C., and generally greater than about −40° C., such as greater than about −20° C. Such PHAs can dramatically reduce the stiffness properties of the cellulose acetate, thereby increasing the elongation properties and decreasing the flexural modulus properties. As used herein, the glass transition temperature can be determined by dynamic mechanical analysis in accordance with ASTM Test E1640-09.

When present, one or more PHAs can be contained in the polymer composition in an amount of about 2% or greater, such as about 3% or greater, such as about 5% or greater, such as about 7% or greater, such as about 10% or greater, such as about 12% or greater, such as about 15% or greater, such as about 18% or greater. One or more PHAs are generally present in the polymer composition in an amount of about 30% or less, such as in an amount of about 25% or less, such as in an amount of about 20% or less, such as in an amount of about 15% or less.

In addition to one or more PHAs, the polymer composition can contain various other bio-based polymers, such as a polylactic acid or a polycaprolactone. Polylactic acid also known as "PLAs" are well suited for combining with one or more PHAs. Polylactic acid polymers are generally stiffer and more rigid than PHAs and thus can be added to the polymer composition for further refining the properties of the overall formulation.

Polylactic acid may generally be derived from monomer units of any isomer of lactic acid, such as levorotory-lactic acid ("L-lactic acid"), dextrorotatory-lactic acid ("D-lactic acid"), meso-lactic acid, or mixtures thereof. Monomer units may also be formed from anhydrides of any isomer of lactic acid, including L-lactide, D-lactide, meso-lactide, or mixtures thereof. Cyclic dimers of such lactic acids and/or lactides may also be employed. Any known polymerization method, such as polycondensation or ring-opening polymerization, may be used to polymerize lactic acid. A small amount of a chain-extending agent (e.g., a diisocyanate compound, an epoxy compound or an acid anhydride) may also be employed. The polylactic acid may be a homopolymer or a copolymer, such as one that contains monomer units derived from L-lactic acid and monomer units derived from D-lactic acid. Although not required, the content of one of the monomer units derived from L-lactic acid and the monomer units derived from D-lactic acid is preferably about 85 mole % or more, in some embodiments about 90 mole % or more, and in some embodiments, about 95 mole % or more. Multiple polylactic acids, each having a different ratio between the monomer unit derived from L-lactic acid and the monomer unit derived from D-lactic acid, may be blended at an arbitrary percentage.

In one particular embodiment, the polylactic acid has the following general structure:

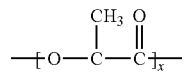

The polylactic acid typically has a number average molecular weight ("$M_n$") ranging from about 40,000 to about 160,000 grams per mole, in some embodiments from about 50,000 to about 140,000 grams per mole, and in some embodiments, from about 80,000 to about 120,000 grams per mole. Likewise, the polymer also typically has a weight average molecular weight ("$M_w$") ranging from about 80,000 to about 200,000 grams per mole, in some embodiments from about 100,000 to about 180,000 grams per mole, and in some embodiments, from about 110,000 to about 160,000 grams per mole. The ratio of the weight average molecular weight to the number average molecular weight ("$M_w/M_n$"), i.e., the "polydispersity index", is also relatively low. For example, the polydispersity index typically ranges from about 1.0 to about 3.0, in some embodiments from about 1.1 to about 2.0, and in some embodiments, from about 1.2 to about 1.8. The weight and number average molecular weights may be determined by methods known to those skilled in the art.

The polylactic acid may also have an apparent viscosity of from about 50 to about 600 Pascal seconds (Pa·s), in some embodiments from about 100 to about 500 Pa·s, and in some embodiments, from about 200 to about 400 Pa·s, as determined at a temperature of 190° C. and a shear rate of 1000 sec-. The melt flow rate of the polylactic acid (on a dry basis) may also range from about 0.1 to about 40 grams per 10 minutes, in some embodiments from about 0.5 to about 20 grams per 10 minutes, and in some embodiments, from about 5 to about 15 grams per 10 minutes, determined at a load of 2160 grams and at 190° C.

Polylactic acid can be present in the polymer composition in an amount of about 1% or greater, such as in an amount of about 3% or greater, such as in an amount of about 5% or greater, and generally in an amount of about 20% or less, such as in an amount of about 15% or less, such as in an amount of about 10% or less, such as in an amount of about 8% or less.

As described above, another bio-based polymer that may be combined with cellulose acetate alone or in conjunction with other bio-based polymers is polycaprolactone having a molecular weight higher than a polycaprolactone plasticizer. Polycaprolactone, similar to PHAs, can be formulated to have a relatively low glass transition temperature. The glass transition temperature, for instance, can be less than about 10° C., such as less than about −5° C., such as less than about −20° C., and generally greater than about −60° C. The polymers can be produced so as to be amorphous or semi-crystalline. The crystallinity of the polymers can be less than about 50%, such as less than about 25%.

Polycaprolactones can be made having a number average molecular weight of generally greater than about 5,000, such as greater than about 8,000, and generally less than about 15,000, such as less than about 12,000.

Polycaprolactones can be contained in the polymer composition in an amount of about 2% or greater, such as about 3% or greater, such as about 5% or greater, such as about 7% or greater, such as about 10% or greater, such as about 12% or greater, such as about 15% or greater, such as about 18% or greater. Polycaprolactones are generally present in the polymer composition in an amount of about 30% or less, such as in an amount of about 25% or less, such as in an amount of about 20% or less, such as in an amount of about 15% or less.

Other bio-based polymers that may be incorporated into the polymer composition include polybutylene succinate, polybutylene adipate terephthalate, a plasticized starch, other starch-based polymers, and the like. In addition, the bio-based polymer can be a polyolefin or polyester polymer made from renewable resources. For example, such polymers include bio-based polyethylene, bio-based polybutylene terephthalate, and the like.

The polymer composition of the present disclosure may optionally contain various other additives and ingredients. For instance, the polymer composition may contain antioxidants, pigments, lubricants, softening agents, antibacterial agents, antifungal agents, preservatives, flame retardants, and combinations thereof. Each of the above additives can generally be present in the polymer composition in an amount of about 5% or less, such as in an amount of about 2% or less, and generally in an amount of about 0.1% or greater, such as in an amount of about 0.3% or greater.

Flame retardants suitable for use in conjunction with a cellulose ester plastic described herein may, in some embodiments, include, but are not limited to, silica, metal oxides, phosphates, catechol phosphates, resorcinol phosphates, borates, inorganic hydrates, aromatic polyhalides, and the like, and any combination thereof.

Antifungal and/or antibacterial agents suitable for use in conjunction with a cellulose ester plastic described herein may, in some embodiments, include, but are not limited to, polyene antifungals (e.g., natamycin, rimocidin, filipin, nystatin, amphotericin B, candicin, and hamycin), imidazole antifungals such as miconazole (available as MICATIN® from WellSpring Pharmaceutical Corporation), ketoconazole (commercially available as NIZORAL® from McNeil consumer Healthcare), clotrimazole (commercially available as LOTRAMIN® and LOTRAMIN AF® available from Merck and CANESTEN® available from Bayer), econazole, omoconazole, bifonazole, butoconazole, fenticonazole, isoconazole, oxiconazole, sertaconazole (commercially available as ERTACZO® from OrthoDematologics), sulconazole, and tioconazole; triazole antifungals such as fluconazole, itraconazole, isavuconazole, ravuconazole, posaconazole, voriconazole, terconazole, and albaconazole), thiazole antifungals (e.g., abafungin), allylamine antifungals (e.g., terbinafine (commercially available as LAMISIL® from Novartis Consumer Health, Inc.), naftifine (commercially available as NAFTIN® available from Merz Pharmaceuticals), and butenafine (commercially available as LOTRAMIN ULTRA from Merck), echinocandin antifungals (e.g., anidulafungin, caspofungin, and micafungin), polygodial, benzoic acid, ciclopirox, tolnaftate (e.g., commercially available as TINACTIN® from MDS Consumer Care, Inc.), undecylenic acid, flucytosine, 5-fluorocytosine, griseofulvin, haloprogin, caprylic acid, and any combination thereof.

Preservatives suitable for use in conjunction with a cellulose ester plastic described herein may, in some embodiments, include, but are not limited to, benzoates, parabens (e.g., the propyl-4-hydroxybenzoate series), and the like, and any combination thereof.

Pigments and dyes suitable for use in conjunction with a cellulose ester plastic described herein may, in some embodiments, include, but are not limited to, plant dyes, vegetable dyes, titanium dioxide, silicon dioxide, tartrazine, E102, phthalocyanine blue, phthalocyanine green, quinacridones, perylene tetracarboxylic acid di-imides, dioxazines, perinones disazo pigments, anthraquinone pigments, carbon black, metal powders, iron oxide, ultramarine, calcium carbonate, kaolin clay, aluminum hydroxide, barium sulfate, zinc oxide, aluminum oxide, CARTASOL® dyes (cationic dyes, available from Clariant Services) in liquid and/or granular form (e.g., CARTASOL® Brilliant Yellow K-6G liquid, CARTASOL® Yellow K-4GL liquid, CARTASOL®

Yellow K-GL liquid, CARTASOL® Orange K-3GL liquid, CARTASOL® Scarlet K-2GL liquid, CARTASOL® Red K-3BN liquid, CARTASOL® Blue K-5R liquid, CARTASOL® Blue K-RL liquid, CARTASOL® Turquoise K-RL liquid/granules, CARTASOL® Brown K-BL liquid), FASTUSOL dyes (an auxochrome, available from BASF) (e.g., Yellow 3GL, Fastusol C Blue 74L), and the like, any derivative thereof, and any combination thereof.

In some embodiments, pigments and dyes suitable for use in conjunction with a cellulose ester plastic described herein may be food-grade pigments and dyes. Examples of food-grade pigments and dyes may, in some embodiments, include, but are not limited to, plant dyes, vegetable dyes, titanium dioxide, and the like, and any combination thereof.

Antioxidants may, in some embodiments, mitigate oxidation and/or chemical degradation of a cellulose ester plastic described herein during storage, transportation, and/or implementation. Antioxidants suitable for use in conjunction with a cellulose ester plastic described herein may, in some embodiments, include, but are not limited to, anthocyanin, ascorbic acid, glutathione, lipoic acid, uric acid, resveratrol, flavonoids, carotenes (e.g., beta-carotene), carotenoids, tocopherols (e.g., alpha-tocopherol, beta-tocopherol, gamma-tocopherol, and delta-tocopherol), tocotrienols, tocopherol esters (e.g., tocopherol acetate), ubiquinol, gallic acids, melatonin, secondary aromatic amines, benzofuranones, hindered phenols, polyphenols, hindered amines, organophosphorus compounds, thioesters, benzoates, lactones, hydroxylamines, butylated hydroxytoluene ("BHT"), butylated hydroxyanisole ("BHA"), hydroquinone, and the like, and any combination thereof.

In some embodiments, antioxidants suitable for use in conjunction with a cellulose ester plastic described herein may be food-grade antioxidants. Examples of food-grade antioxidants may, in some embodiments, include, but are not limited to, ascorbic acid, vitamin A, tocopherols, tocopherol esters, beta-carotene, flavonoids, BHT, BHA, hydroquinone, and the like, and any combination thereof.

The polymer composition of the present disclosure can be formed into any suitable polymer article using any technique known in the art. For instance, polymer articles can be formed from the polymer composition through extrusion, injection molding, blow molding, and the like.

Polymer compositions formulated in accordance with the present disclosure can display many improved properties and characteristics in relation to many cellulose acetate compositions formulated in the past.

For example, the polymer composition of the present disclosure can be formulated so as to exhibit a flexural modulus of about 2000 MPa or less, such as about 1900 MPa or less, such as about 1800 MPa or less, such as about 1700 MPa or less, such as about 1600 MPa or less. The flexural modulus can be about 500 MPa or greater, such as about 700 MPa or greater, such as about 1000 MPa or greater, such as about 1200 MPa or greater. The flexural modulus of the polymer composition may be measured by ISO Test 178:2010.

The polymer composition of the present disclosure can exhibit a tensile modulus about 2000 MPa or less, such as about 1900 MPa or less, such as about 1800 MPa or less, such as about 1700 MPa or less, such as about 1600 MPa or less. The tensile modulus can be about 800 MPa or greater, such as about 900 MPa or greater, such as about 1000 MPa or greater, such as about 1200 MPa or greater. The tensile modulus of the polymer composition can be measured by ISO Test 527-1:2012.

The polymer composition of the present disclosure can also display improved stretch characteristics. For instance, the polymer composition can exhibit an elongation at break of about 10% or greater, such as about 12% or greater, such as about 15% or greater, such as about 20% or greater, such as about 30% or greater, such as about 40% or greater, such as about 50% or greater, such as about 60% or greater, such as about 70% or greater, such as about 80% or greater. The elongation at break can be less than about 500%, such as less than about 400%, such as less than about 200%, such as less than about 150%. Elongation at break can be measured according to ISO Test 527-1:2012.

In one aspect, the polymer composition containing the cellulose acetate can be formulated such that the polymer composition has properties very comparable to petroleum-based polymers, such as polypropylene. By matching the physical properties of a petroleum-based polymer, the polymer composition of the present disclosure is well suited to replacing those polymers in many different end use applications.

Polymer articles that may be made in accordance with the present disclosure include drinking straws, beverage holders, automotive parts, knobs, door handles, consumer appliance parts, and the like.

For instance, referring to FIG. 1, a drinking straw 10 is shown that can be made in accordance with the present disclosure. In the past, drinking straws were conventionally made from petroleum-based polymers, such as polypropylene. The cellulose acetate polymer composition of the present disclosure, however, can be formulated so as to match the physical properties of polypropylene. Thus, drinking straws 10 can be produced in accordance with the present disclosure and be completely biodegradable.

Figure 2:
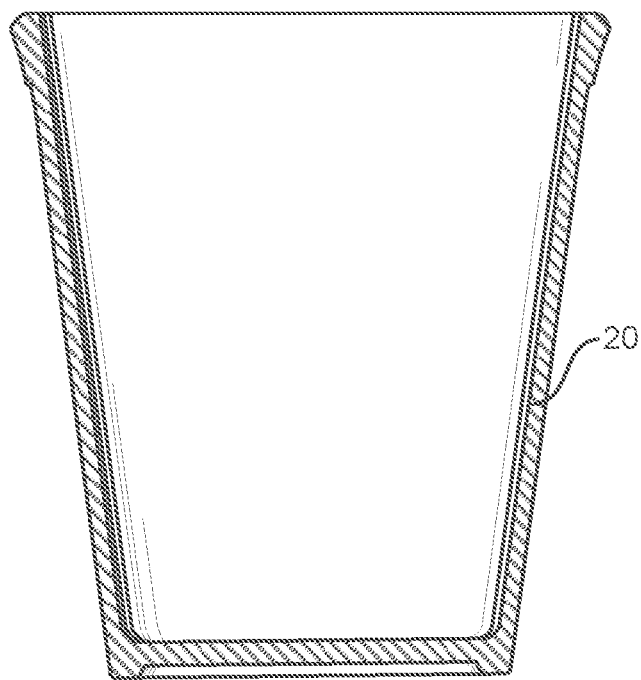
FIG. 2 is a cross-sectional view of a beverage holder that may be made in accordance with the present disclosure.
Figure 7:
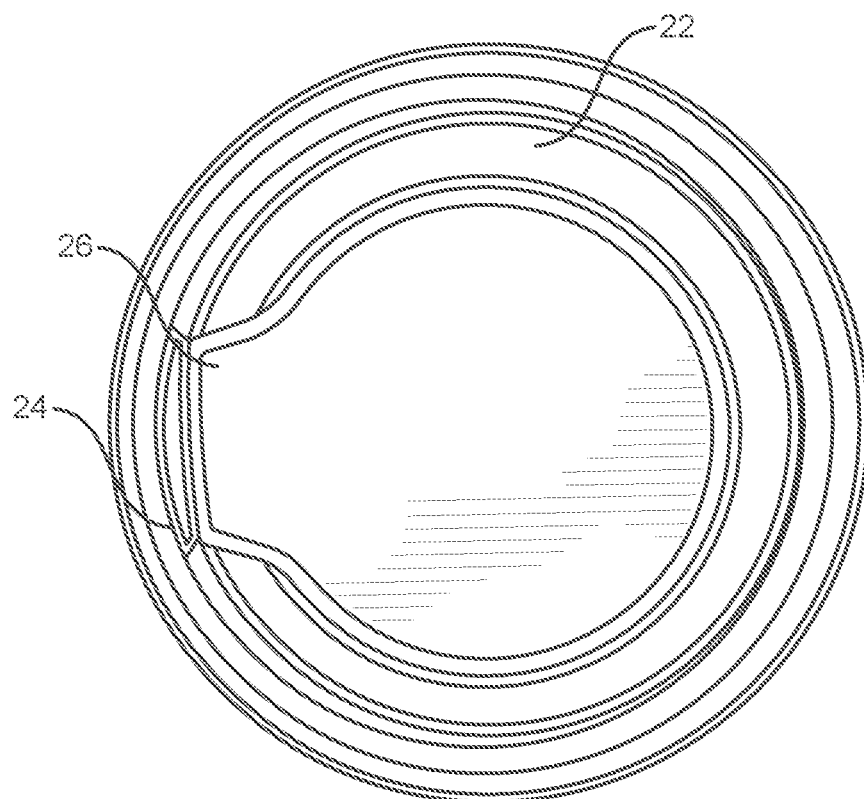
FIG. 7 is a perspective view of a lid made in accordance with the present disclosure.

Referring to FIG. 2, a cup or beverage holder 20 is shown that can also be made in accordance with the present disclosure. The cup 20 can be made, for instance, using injection molding or through any suitable thermoforming process. As shown in FIG. 7, a lid 22 for the cup 20 can also be made from the polymer composition of the present disclosure. The lid can include a pour spout 24 for dispensing a beverage from the cup 20. In addition to lids for beverage holders, the polymer composition of the present disclosure can be used to make lids for all different types of containers, including food containers, package containers, storage containers and the like.

Figure 3:
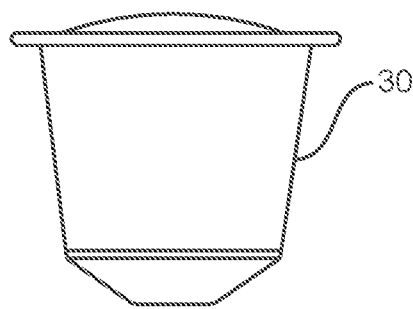
FIG. 3 is a side view of one embodiment of a beverage pod that can be made in accordance with the present disclosure.
Figure 4:
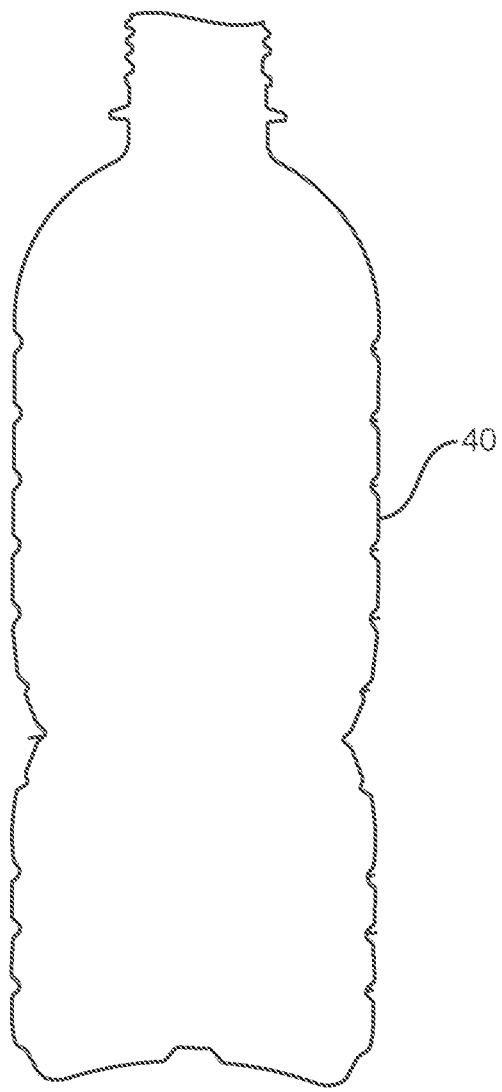
FIG. 4 is a cross-sectional view of a drinking bottle that may be made in accordance with the present disclosure.

Instill another embodiment, the polymer composition can be used to produce a hot beverage pod 30 as shown in FIG. 3. In addition to the beverage pod 30, the polymer composition can also be used to produce a plastic bottle 40 as shown in FIG. 4, which can serve as a water bottle or other sport drink container.

Figure 5:
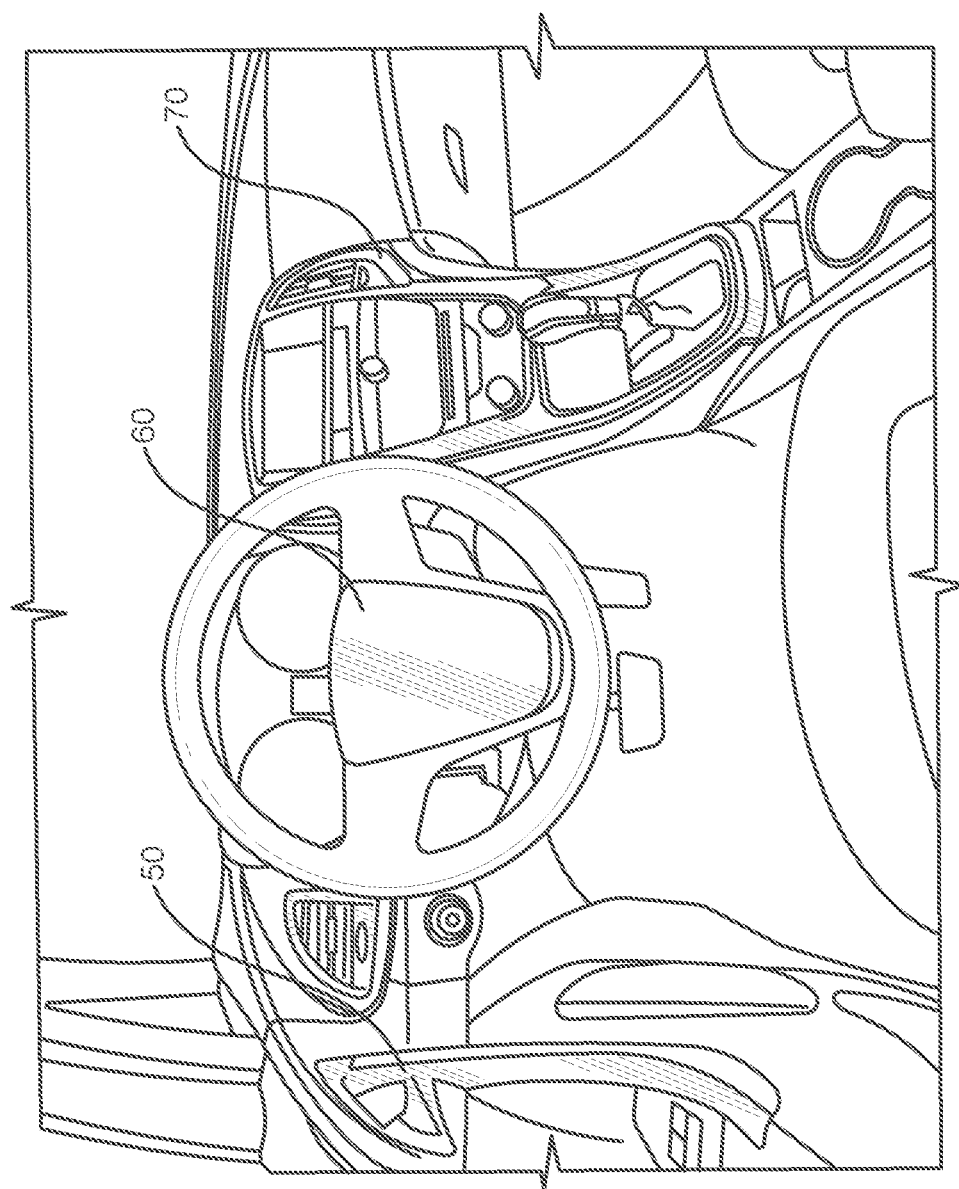
FIG. 5 is a perspective view of an automotive interior illustrating various articles that may be made in accordance with the present disclosure.

Referring to FIG. 5, an automotive interior is illustrated. The automotive interior includes various automotive parts that may be made in accordance with the present disclosure. The polymer composition, for instance, can be used to produce automotive part 50, which comprises at least a portion of an interior door handle. The polymer composition may also be used to produce a part on the steering column, such as automotive part 60. In general, the polymer composition can be used to mold any suitable decorative trim piece or bezel, such as trim piece 70. In addition, the polymer composition can be used to produce knobs or handles that may be used on the interior of the vehicle.

Figure 6:
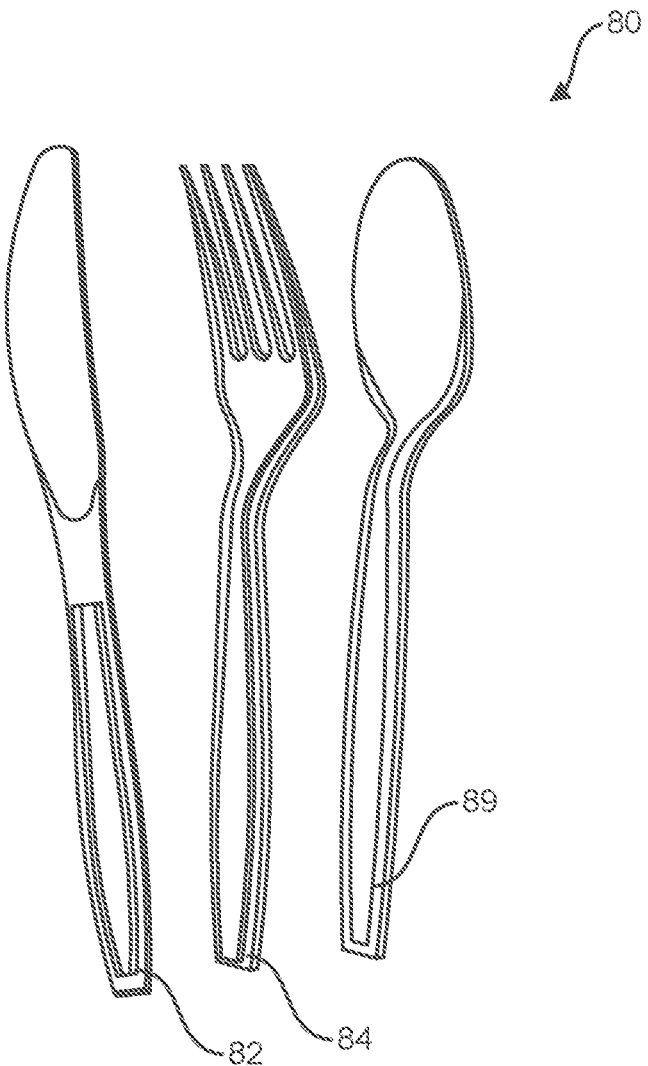
FIG. 6 is a perspective view of cutlery made in accordance with the present disclosure.

The polymer composition is also well suited to producing cutlery, such as forks, spoons, and knives. For example, referring to FIG. 6, disposable cutlery 80 is shown. The cutlery 80 includes a knife 82, a fork 84, and a spoon 86.

Figure 8:
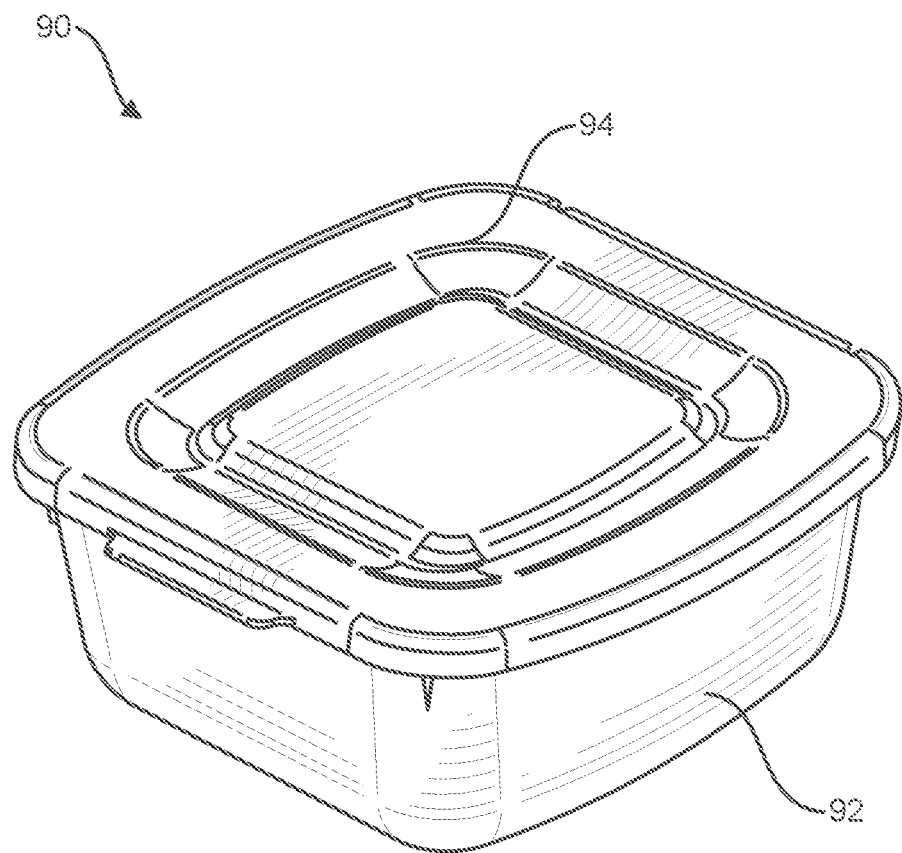
FIG. 8 is a perspective view of a container made in accordance with the present disclosure.

Instill another embodiment, the polymer composition can be used to produce a storage container 90 as shown in FIG. 8. The storage container 90 can include a lid 94 that cooperates and engages the rim of a bottom 92. The bottom 92 can define an interior volume for holding items. The container 90 can be used to hold food items or dry goods.

In still other embodiments, the polymer composition can be formulated to produce paper plate liners, eyeglass frames, screwdriver handles, or any other suitable part. Still other products that can be made in accordance with the present disclosure include all different types of injection molded articles. In producing the above products, the polymer composition of the present disclosure can be formulated so as to increase stiffness, temperature resistance, and/or tensile strength depending upon the particular application and the desired result.

The cellulose ester composition of the present disclosure is also particularly well-suited for use in producing medical devices including all different types of medical instruments. The cellulose ester composition, for instance, is well suited to replacing other polymers used in the past, such as polycarbonate polymers. Not only is the cellulose ester composition of the present disclosure biodegradable, but the composition has a unique "warm touch" feel when handled. Thus, the composition is particularly well suited for constructing housings for medical devices. When held or grasped, for instance, the polymer composition retains heat and makes the device or instrument feel warmer than devices made from other materials in the past. The sensation is particularly soothing and comforting to those in need of medical assistance and can also provide benefits to medical providers. In one aspect, the cellulose ester composition used to produce housings for medical devices includes a cellulose ester polymer combined with a plasticizer (e.g. triacetin alone or in combination with other plasticizers) and optionally another bio-based polymer. In addition, the composition can contain one or more coloring agents.

Figure 9:
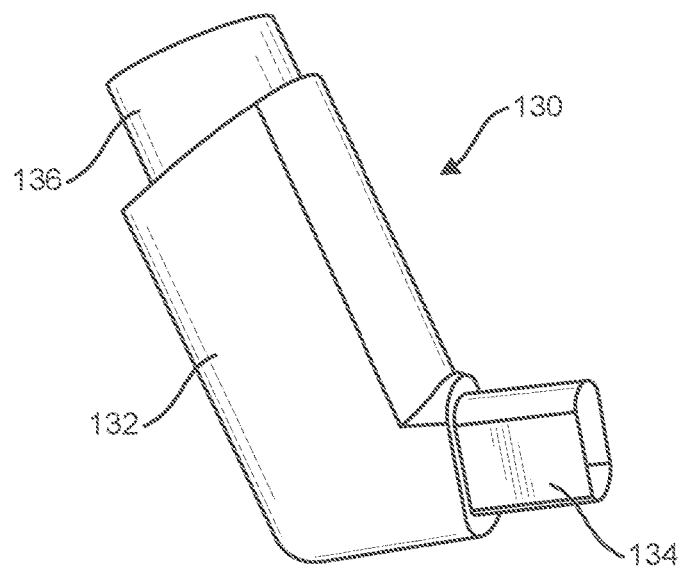
FIG. 9 illustrates one embodiment of a medical apparatus comprising a composition prepared according to the present disclosure.

Referring to FIG. 9, for instance, an inhaler 130 is shown that may be made from the cellulose ester polymer composition. The inhaler 130 includes a housing 132 attached to a mouthpiece 134. In operative association with the housing 132 is a plunger 136 for receiving a canister containing a composition to be inhaled. The composition may comprise a spray or a powder.

During use, the inhaler 130 administers metered doses of a medication, such as an asthma medication to a patient. The asthma medication may be suspended or dissolved in a propellant or may be contained in a powder. When a patient actuates the inhaler to breathe in the medication, a valve opens allowing the medication to exit the mouthpiece. In accordance with the present disclosure, the housing 132, the mouthpiece 134 and the plunger 136 can all be made from a polymer composition as described above.

Figure 10:
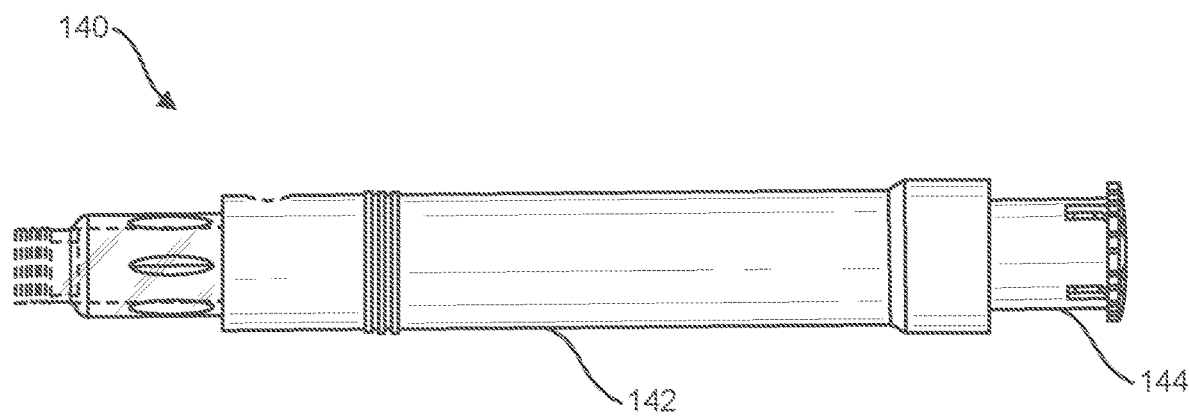
FIG. 10 illustrates another embodiment of a medical apparatus comprising a composition prepared according to the present disclosure.

Referring to FIG. 10, another medical product that may be made in accordance with the present disclosure is shown. In FIG. 10, a medical injector 140 is illustrated. The medical injector 140 includes a housing 142 in operative association with a plunger 144. The housing 142 may slide relative to the plunger 144. The medical injector 140 may be spring loaded. The medical injector is for injecting a drug into a patient typically into the thigh or the buttocks. The medical injector can be needleless or may contain a needle. When containing a needle, the needle tip is typically shielded within the housing prior to injection. Needleless injectors, on the other hand, can contain a cylinder of pressurized gas that propels a medication through the skin without the use of a needle. In accordance with the present disclosure, the housing 142 and/or the plunger 144 can be made from a polymer composition as described above.

Figure 12:
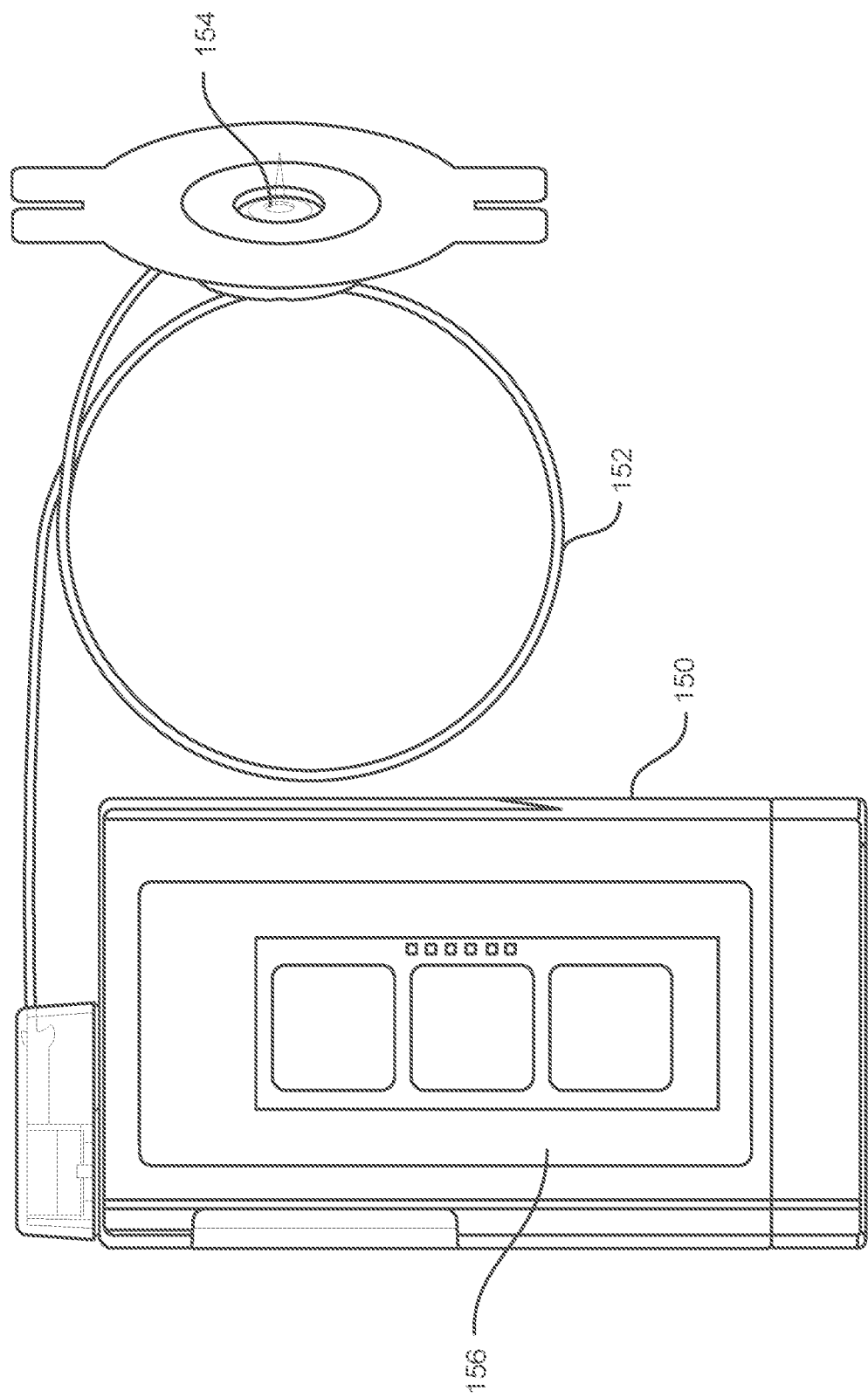
FIG. 12 illustrates another embodiment of a medical apparatus comprising a composition prepared according to the present disclosure.

The medical injector 140 as shown in FIG. 10 can be used to inject insulin. Referring to FIG. 12, an insulin pump device 150 is illustrated that can include a housing 156 also made from the polymer composition of the present disclosure. The insulin pump device 150 can include a pump in fluid communication with tubing 152 and a needle 154 for subcutaneously injecting insulin into a patient.

The polymer composition of the present disclosure can also be used in all different types of laparoscopic devices. Laparoscopic surgery refers to surgical procedures that are performed through an existing opening in the body or through one or multiple small incisions. Laparoscopic devices include different types of laparoscopes, needle drivers, trocars, bowel graspers, rhinolaryngoscopes and the like.

Figure 11:
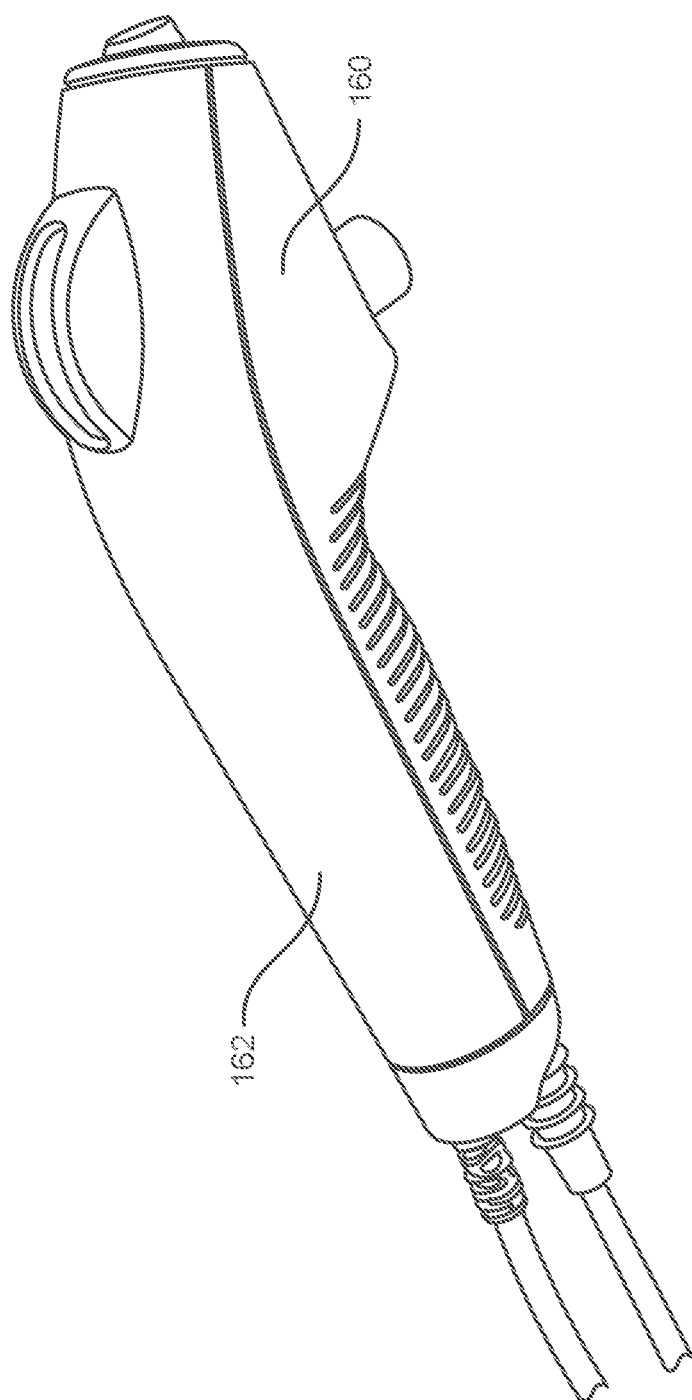
FIG. 11 illustrates still another embodiment of a medical apparatus comprising a composition prepared according to the present disclosure.

Referring to FIG. 11, for example, a rhinolaryngoscope 160 made in accordance with the present disclosure is shown. The rhinolaryngoscope 160 includes small, flexible plastic tubes with fiberoptics for viewing airways. The rhinolaryngoscope can be attached to a television camera to provide a permanent record of an examination. The rhinolaryngoscope 160 includes a housing 162 made from the polymer composition of the present disclosure. The rhinolaryngoscope 160 is for examining the nose and throat. With a rhinolaryngoscope, a doctor can examine most of the inside of the nose, the eustachian tube openings, the adenoids, the throat, and the vocal cords.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A polymer composition comprising:
   a cellulose acetate;
   at least one bio-based polymer; and
   a bloom resistant or bio-based plasticizer that is phthalate-free, the plasticizer comprising a benzoate ester, an alkyl ketal ester, a non-petroleum hydrocarbon ester, a polycaprolactone having a number average molecular weight of 1000 or less, or mixtures thereof, wherein the cellulose acetate contains cellulose diacetate in an amount greater than about 90% by weight.

2. A polymer composition as defined in claim 1, wherein the plasticizer comprises a benzoate ester.

3. A polymer composition as defined in claim 1, wherein the plasticizer comprises glycerol tribenzoate.

4. A polymer composition as defined in claim 1, wherein the plasticizer comprises sucrose benzoate.

5. A polymer composition as defined in claim 1, wherein the plasticizer comprises an alkyl ketal ester.

6. A polymer composition as defined in claim 1, wherein the plasticizer comprises an alkyl ketal ester and a benzoate ester.

7. A polymer composition as defined in claim 1, wherein the plasticizer comprises a non-petroleum hydrocarbon ester having a specific gravity of from about 1.17 to about 1.18 when measured at 25° C.

8. A polymer composition as defined in claim 1, wherein the polymer composition has an elongation at break and the elongation at break of the polymer composition is about 10% or greater and about 150% or less.

9. A polymer composition as defined in claim 1, wherein one or more bio-based polymers are present in the polymer composition in an amount of about 6% or greater.

10. A polymer composition as defined in claim 1, wherein the cellulose acetate is present in the composition in an amount of from about 15% to about 85% by weight and the plasticizer is present in the composition in an amount of from about 8% to about 40% by weight.

11. A polymer composition as defined in claim 1, wherein the cellulose acetate consists essentially of cellulose diacetate.

12. A polymer composition as defined in claim 1, wherein the bio-based polymer comprises a polyhydroxyalkanoate, a polylactic acid, a polycaprolactone having a number average molecular weight of greater than 1000, or mixtures thereof.

13. A polymer composition as defined in claim 12, wherein the bio-based polymer comprises the polyhydroxyalkanoate, the polyhydroxyalkanoate comprising a polyhydroxybutyrate.

14. A polymer composition as defined in claim 1, wherein the polymer composition contains at least two bio-based polymers.

15. A polymer composition as defined in claim 14, wherein the polymer composition contains a polylactic acid and a polyhydroxyalkanoate.

16. A polymer composition as defined in claim 1, wherein the bio-based polymer comprises poly(3-hydroxybutyrate-co-3-hydroxy valerate).

17. An article made from the polymer composition as defined in claim 1.

18. An article as defined in claim 17, wherein the article is a beverage holder, a drinking straw, a hot beverage pod, a container, a lid, a spoon, a fork, a knife, packaging, or an interior automotive part.

19. A medical device comprising a housing made from a polymer composition, the polymer composition comprising a cellulose acetate; at least one bio-based polymer, the at least one bio-based polymer comprising a polylactic acid, a polycaprolactone, or a polyhydroxyalkanoate; and a bloom resistant or bio-based plasticizer that is phthalate-free, the plasticizer comprising a benzoate ester, an alkyl ketal ester, a non-petroleum hydrocarbon ester, a polycaprolactone having a number average molecular weight of 1000 or less, or mixtures thereof, wherein the cellulose acetate contains cellulose diacetate in an amount greater than about 90% by weight.

20. A polymer composition comprising:
a cellulose acetate grafted with a bloom resistant or bio-based plasticizer that is phthalate-free, the plasticizer comprising a benzoate ester, an alkyl ketal ester, a non-petroleum hydrocarbon ester, a polycaprolactone having a number average molecular weight of 1000 or less, or mixtures thereof; and
at least one bio-based polymer, wherein the cellulose acetate contains cellulose diacetate in an amount greater than about 90% by weight.

* * * * *